(12) United States Patent
Rishe

(10) Patent No.: US 6,795,825 B2
(45) Date of Patent: Sep. 21, 2004

(54) DATABASE QUERYING SYSTEM AND METHOD

(76) Inventor: Naphtali David Rishe, 100 Lincoln Rd., Suite 1547, Miami Beach, FL (US) 33139

(*) Notice: Subject to any disclaimer, the term of this patent is extended or adjusted under 35 U.S.C. 154(b) by 32 days.

(21) Appl. No.: 09/729,630

(22) Filed: Dec. 1, 2000

(65) Prior Publication Data

US 2002/0107840 A1 Aug. 8, 2002

Related U.S. Application Data

(60) Provisional application No. 60/231,773, filed on Sep. 12, 2000.

(51) Int. Cl.[7] ............................................. G06F 17/30
(52) U.S. Cl. ........................ 707/10; 707/3; 707/104.1; 709/201
(58) Field of Search ............................. 707/3, 10, 100, 707/102, 103 R, 104.1; 709/200, 201, 203

(56) References Cited

U.S. PATENT DOCUMENTS

| | | | | |
|---|---|---|---|---|
| 5,806,066 A | * | 9/1998 | Golshani et al. | ............ 707/100 |
| 5,963,936 A | * | 10/1999 | Cochrane et al. | .............. 707/3 |
| 5,970,490 A | * | 10/1999 | Morgenstern | ................ 707/10 |
| 6,016,497 A | * | 1/2000 | Suver | ...................... 707/103 R |
| 6,055,540 A | * | 4/2000 | Snow et al. | ..................... 707/3 |
| 6,131,099 A | * | 10/2000 | Johnson et al. | ........... 707/104.1 |
| 6,356,906 B1 | * | 3/2002 | Lippert et al. | ................. 707/10 |
| 6,363,391 B1 | * | 3/2002 | Rosenstee | .................... 707/102 |

* cited by examiner

Primary Examiner—Charles Rones
Assistant Examiner—Hassan Mahmoudi
(74) Attorney, Agent, or Firm—McKenna Long & Aldridge LLP

(57) ABSTRACT

A database querying system to facilitate the retrieval of desired data from a database including information categories, object data items, a processor assembly responsive to a user query, a relationship category defined by relationships between the object data items of the information categories, the user query including a relationship identifier corresponding to the relationship category. Interpretation of relational-database query and data manipulation languages against non-relational schemas, by regarding the schemas as representing virtual relational databases with every class replaced by a virtual table comprised of all the attributes reachable from the class by a chain of relations. The interpretation allows concise and simple querying of non-relational and relational databases in languages originally intended only for relational databases. The system further provides wrapping of a relational database into a semantic conceptual schema to allow formulation of queries in SQL against the wrapping schema, reducing the size of SQL queries.

25 Claims, 6 Drawing Sheets

PHYSICAL-OBSERVATION-STATION
*physical-observation-station-id-key*:Integer 1:1; *comments*:String; *housing*:String; *structure*:String; *is-part-of--physical-observation-station-id*:Integer;

LOCATION
*north-UTM-in-key*:Number; *east-UTM-in-key*:Number; *elevation-ft*:Number; *description*:String;

ORGANIZATION
*name-key*:String 1:1; *description*:String;

PROJECT
*name-key*:String 1:1; *description*:String; *comments*:String; *starting-date*:Date; *ending-date*:Date;

MEASUREMENT-TYPE
*name-key*:String 1:1; *measurement-unit*:String; *upper-limit*:Number; *lower-limit*:Number;

FIXED-STATION
*physical-observation-station-id-key*:Integer 1:1; *platform-height-ft*:0..50.000; *located-at--north-UTM*:Number; *located-at--east-UTM*:Number;

MEASUREMENT
*observation-id-key*:Integer 1:1; *comment*:String; *time*:Date-time; *value*:Number; *of--name*:String; *by--physical-observation-station-id*:Integer;

IMAGE
*observation-id-key*:Integer 1:1; *comment*:String; *time*:Date-time; *Image*:Raw; *subject*:String; *direction-of-view*:0..360; *comments*:String; *type*:Char(3); *by--physical-observation-station-id*:Integer;

PHYSICAL-OBSERVATION-STATION--BELONGS-TO--ORGANIZATION
*physical-observation-station-Id-in-key*:Integer; *organization--name-in-key*:String;

ORGANIZATION--RUNS--PROJECT
*organization--name-in-key*:String; *project--name-in-key*:String;

PHYSICAL-OBSERVATION-STATION--SERVES--PROJECT
*physical-observation-station-id-in-key*:Integer; *project--name-in-key*:String;

ORGANIZATION--IS-PART-OF--ORGANIZATION
*organization--name-in-key*:String; *organization-2--name-in-key*:String;

FIGURE 5

List of the time and housing of temperature measurements over 50 degrees

SQL statement based on semantic schema:

```
select housing,time from MEASUREMENT where of__name='Temperature' and value>50
```

SQL statement based on relational schema:

```
select housing, time
from PHYSICAL_OBSERVATION_STATION, MEASUREMENT
where exists
    (select * from MEASUREMENT-TYPE
    where name_key = of__name and name_key = 'Temperature' and
        by_physical_observation_station_id = physical_observation_station_id_key and
        value > 50)
```

FIGURE 6

DATABASE QUERYING SYSTEM AND METHOD

CLAIM OF PRIORITY

The present application is based on and a claim to priority is made under 35 U.S.C. Section 119(e) to provisional patent application currently pending in the U.S. Patent and Trademark Office having Ser. No. 60/231,773 and a filing date of Sep. 12, 2000.

BACKGROUND OF THE INVENTION

1. Field of the Invention

The present invention relates to a database querying system and method which is substantially effective, and simplifies a querying syntax that must be utilized in order to achieve the effective retrieval of desired information from a relational or non-relational database by means of any language or interface intended originally only for relational databases. The system and method operate in a manner which can be used for initial database setup and programming as well as for the adaptation of existing standardized database querying systems to utilize the present simplified, more concise querying method.

2. Description of the Related Art

A variety of different types and information are commonly stored in databases, those databases often including many different categories and types of information which are to be made available for retrieval as needed. While some databases are relatively simple, in a variety of uses and applications, the nature and amount of information contained by the database can be quite extensive and complex, and as a result the querying of that database can be substantially difficult and complicated if truly usable information is going to be retrieved.

In order to provide for that effective retrieval of the desired information from the database of stored data and information, databases are programmed in association with query languages. In particular, the language defines the syntax that a user must utilize in order to effectively communicate with the database and thereby retrieve the appropriate information from the fact database.

Within the various specialized fields of database programming and query language programming, "relational database systems" are widely used, and indeed there are millions of relational database systems installed throughout the world. A relational database can typically be seen as a collection of flat tables, each table aggregating information about objects of certain types, each row of the table containing several fields describing an object; relationships between objects in a relational database are typically represented only implicitly—by cross-referencing values of some fields. As with any programming technology, a number of query languages have been utilized and developed over the years in an attempt to effectuate the appropriate communication between a user and the databases. Of those various query languages, Structured Query Language (SQL) query syntax has been recognized as a primary standard for relational databases and has been employed in the majority of the commercial environments for database products. SQL can be used directly or as an intermediary language via one of its communication protocols, such as the Open Database Connectivity (ODBC) protocol, Java Database Connectivity (JDBC), or Object Linking and Embedding (OLE), that have been recognized as the primary standards. Unfortunately, however, in order to effectively use query relational databases in SQL in the proper manner, users typically need substantial amounts of prior training in order to efficiently utilize the language to correspondingly retrieve information. Specifically, users must understand the language itself, as well as the principles of relational databases, so that they can appropriately draft a query to be utilized by the system processors in order to retrieve the desired data. Even with an understanding of the language, however, in many situations an SQL query can become too complicated if a user is to ensure correctness of the meaning to be achieved thereby. Queries for a relational database are generally quite complex. This is generally because the stored data in a relational database is typically grouped in a variety of different tables, and the relationships among those tables are not explicit. Users submitting queries are then required to identify each table and provide the database with a formula relating between the various tables in order to ultimately arrive at and achieve the desired data results. Naturally, the more abstract those relationships are the more difficult it becomes for users to effectively identify all valid relationships in the appropriate format. Recently, improvements over the relational database approach have been introduced, the trend of such improvements being to allow explicit relationships between classes of objects and a other improvements to the structure of information. Such database structures are called "semantic", "object-relational", "object-oriented", "conceptual schema", "entity-relationship". We refer herein to all such databases with explicit relations as "Semantic Databases". However, such improved database structures required new or enhanced query language and do not allow access in standard language and interface tools intended for relational databases.

Recognizing the problems associated with existing database query systems, three principal efforts regarding improving query interfaces over the relational databases have emerged. Theses include SQL3 (sometimes called SQL 1999), Object Query Language (OQL), and some graphical (or visual) query languages. Such approaches, however, focus on enhancing the expressiveness of the current SQL by changing the data models and syntax of the language. As such, when users need to develop a new application, they must utilize new features that come with the object-orientation, for example super/subclasses and inheritance, in order to enable them to do the database modeling in a way closer to the real world. As can be appreciated, such a requirement is not very helpful to the existing databases that have been developed under the conventional relational model and therefore have no object-oriented features at all. Furthermore, they require that a user learn a new and often equally complex programming technique to set up the database. In particular, both SQL3 and OQL introduce new syntax as well as a semi-procedural programming paradigm to fulfill the object-oriented requirements. Users who are used to programming with a pure declarative language such as the standard SQL (also called SQL92) have difficulty or are uncomfortable when being asked to switch from declarative programming to procedural programming.

Another type of attempt to make the query interface more friendly is to use the so-called graphical query languages. The most important advantage coming up with such attempts is the query visualization. However, there are down sides with the current graphical query languages. For example, a navigational paradigm with a hypertext language is usually restrictive and inefficient. As a result, it often yields useless information after a user has spent a lot of time in navigating in a perplexed cyberspace. A menu-driven query paradigm as found in some desktop databases such as in dBaseIII+ or a table-like browser called Query-By-Example (QBE) such as in Microsoft Access, frees users from having to learn the SQL syntax. But when using any of them for complex queries, users may feel of frustrated when following the procedures of generating the query. In addition to this, users also must know the logical structures of relational database such as foreign key links clearly so as to compose queries with explicitly expressing each join correctly.

Further, there are many other efforts under prototype development. Most notable results include G-log, Functional Graphical Language, Visual-Query-Language, Graqula, DUO, and Query-By-Diagram. These methods, however, do not provide an easy way for the user to formulate very complex queries. Additionally, several software firms have announced products facilitating the interoperability of different data models, for example TITANIUM at Micro Database System. Their efforts are enabling access to single database with different query interfaces based on users' preference. Using these tools, developers first need to convert the existing database to a specific database product, for example TITANIUM database engine, thereby limiting their usefulness, especially if an SQL database is already in use.

Accordingly, it would be beneficial to provide a database querying system and method which can be implemented independently or with an existing relational database to provide a semantic view of the relational schema and enable users to query the relational database in a standard language for relational databases but to utilize the benefits of explicit-relations structure afforded by a semantic schema. Such a system should provide users with a number of object-oriented features, such as super/sub-categories, relationships, and inheritance, which can be utilized by users when formulating their queries, without changing the basic familiar syntax, such as SQL syntax, but merely enhancing its ease of use, expressiveness, and conciseness. Users of non-relational ("semantic") databases would therefore have a way to access their database in a language intended for relational databases; users of relational database would benefit from simplifications and conciseness of queries do to a "semantic" view, while the existing database remains purely relational without any modifications. Additionally, such an improved system should preferably be a pure declarative language, syntactically identical to a known language, such as ODBC SQL 2.0, thereby only requiring a minimum of prior training, and allowing it to be implemented as a middle-ware.

SUMMARY OF THE INVENTION

The present invention relates to a database querying system which is structured to facilitate the retrieval of desired data from a database. The database will typically be of the type that includes at least a first and a second information category. In particular, the database querying system includes a first plurality of object data items categorized in the first information category. Similarly, a second plurality of object data items are also provided and categorized in the second information category.

A processor assembly is also provided with the present system and is responsive to a user query. In particular, the processor assembly is structured to identify the desired data from the user query. To facilitate information retrieval, however, the present system further includes a relationship category. The relationship category is defined as a result of the relationships between the object data items of the information categories. Along these lines, the user query includes at least a relationship identifier. The syntax of the user query is thereby substantially simplified as the user does not require to narrow the abstract relationships between each of a variety of tables and category, but rather the use of the defined relationship identifier in the context of the system of the present invention seamlessly and internally extrapolates the abstract relation into the syntax of a query language for relational databases, even if said language syntax does not recognize abstract relations. Naturally, such a simplification is even more significant in an embodiment including a large number of information categories, as the user is therefore not required to identify each category and a connection therebetween in order to ultimately arrive at the desired information.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 5 is a schematic representation of a relation schema for the hydrology application; and FIG. 6 is an illustration comparing the program sizes of semantic SQL an standard SQL.

Like reference numerals refer to like parts throughout the several views of the drawings.

DETAILED DESCRIPTION OF THE PREFERRED EMBODIMENT

Figure 1:
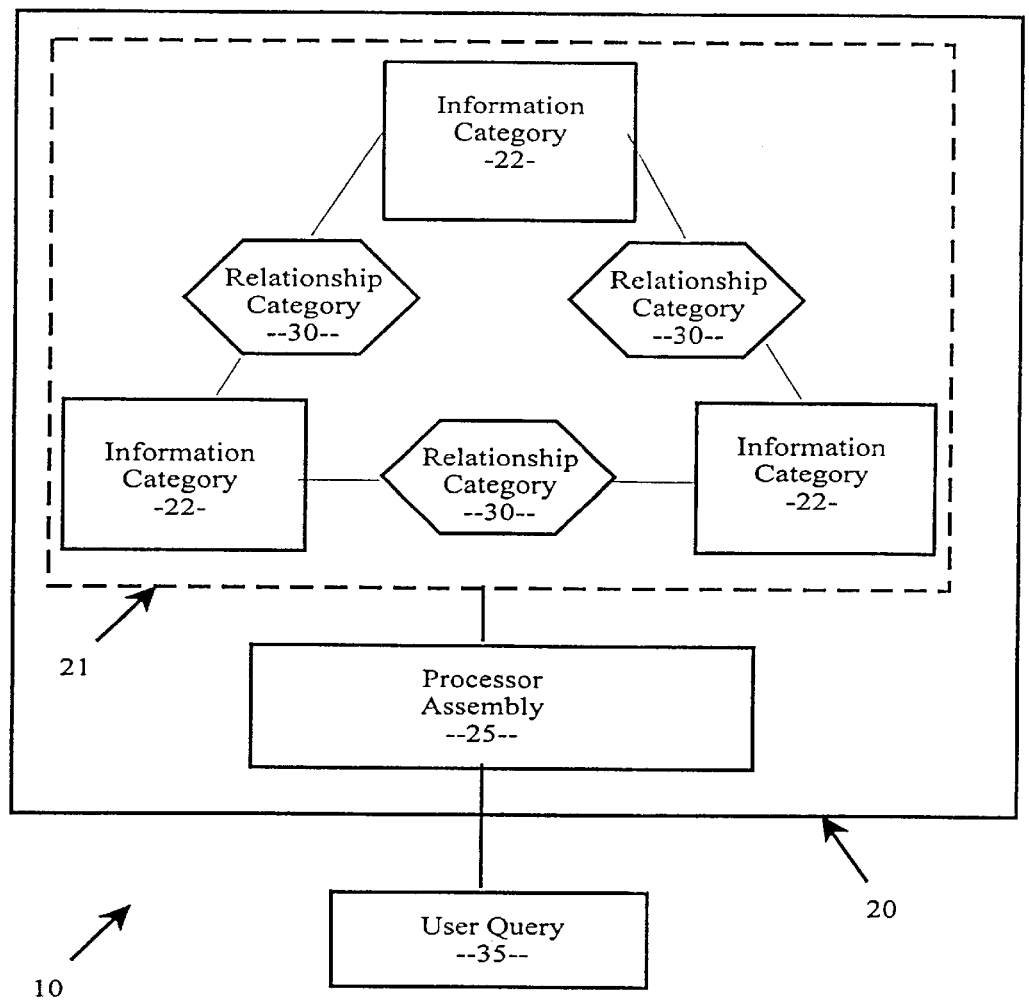
FIG. 1 is a schematic representation of one embodiment of the database querying system of the present invention.

As illustrated in Figures, the present invention is directed towards a database querying system, generally indicated as 10. In particular, the database querying system is structured to substantially facilitate the manner in which a user enters a query and a processors interprets that query for retrieval of desired data from an often very large database of information, by utilizing a relational schema in a much easier, semantic manner. Further, the present database querying system 10 allows for facilitated adaptation and modification of existing databases without requiring substantial modification of syntax and/or the internal processing and operation of the assembly.

Looking specifically to one embodiment of the database querying system 10 of the present invention, it includes at least a first and a second plurality of object data items categorized in at least a first and a second information categories 22. Preferably, however, it is recognized that with most databases, and in particular the databases which can be benefit from the database querying system 10 of the present invention, a plurality, and often a very large plurality of information categories 22 are provided, each containing a corresponding plurality of object data items categorized therein. With further regard to the object data items, typically, the object data items include specific object data, such as a name, department, value, date, etc. These object data items all represent information which may comprise the desired data to be retrieved by a user, and which also help to identify specifically what the desired data includes.

In the illustrated embodiment, at least one computer processor assembly, which may include a personal computer, main frame, network, etc., is defined and includes a storage assembly 21 wherein the object data items from each of the information categories 30 are stored. Additionally, however, the present database querying system 10 includes a processor assembly 25. The processor assembly 25 is responsive to a user query 35 and is structured to identify the desired data as a result of the user query. Specifically, the user query may be provided through any conventional input device and/or a remote or local terminal associated with the processor assembly 25. Further, the user query 35 is generally provided in a query syntax which can be interpreted by the processor 25 so as to effectively identify and thereby retrieve the desired data item.

Looking to the illustrated embodiment of FIG. 1, the present database querying system further includes at least one, but generally a plurality of relationship categories 30. Each relationship category 30 is defined by the relationship between corresponding object data items of the various information categories, including the data objects derivable from those relationships. Furthermore, although some object data items may have relationships only with one another, most have relationships with many object data items in many information categories. As such, a plurality of relationships category 30 are defined correlating the relationships between all related categories. Along these lines, the user query presented by the user preferably includes at least a relationship identifier In most embodiments, the relationship identifier will be associated with at least one object item from the object categories 22 so as to provide a frame of reference for interpretation. The present invention, however, by allowing for the inclusion of the relationship identifier of the user query, presented in a semantic schema, is able to be utilized by the processor assembly 25 in effectively interpreting the query and identifying the desired data in a much more effective manner wherein the syntax of the user query can be substantially simplified. For example, prior querying systems required the inclusion of details for each category so that the query could fully specify a number of objects and can narrow the results of the query in an effective manner to achieve the desired data. The utilization of the relationship identifier within the user query of the present database querying system 10 allows the user to effectuate a more acceptable object oriented or semantic schema wherein the relationships are more simplified and easier to understand and identify. In particular, the database querying system 10 of the present invention is able utilize the relationship identifier so as to effectively replace various complex joints and data links that would have been required, narrowing the query results and providing a much more usable result from the query without requiring the degree of complex query management and creation. Moreover, the data objects in the relationship categories allow the system to provide the results in a more efficient manner.

Although the relationship categories, and the relationships which define them, may actually be generated and stored on a storage assembly 21 of the computer processor assembly 20, in a preferred, illustrated embodiments of the present invention, the relationship categories are virtual categories that are not actually generated and/or filed with data objects resulting from the various relationship identifiers. Rather, the general relationships between the categories that correspond the relationship identifiers between the various object items of the categories are identified and the category can be virtually achieved. As such, the utilization of the relationship identifier within the query allows the processor assembly 25 to appropriately determine the relationship between the object categories, and derives previously required extraneous terms.

Figure 2:
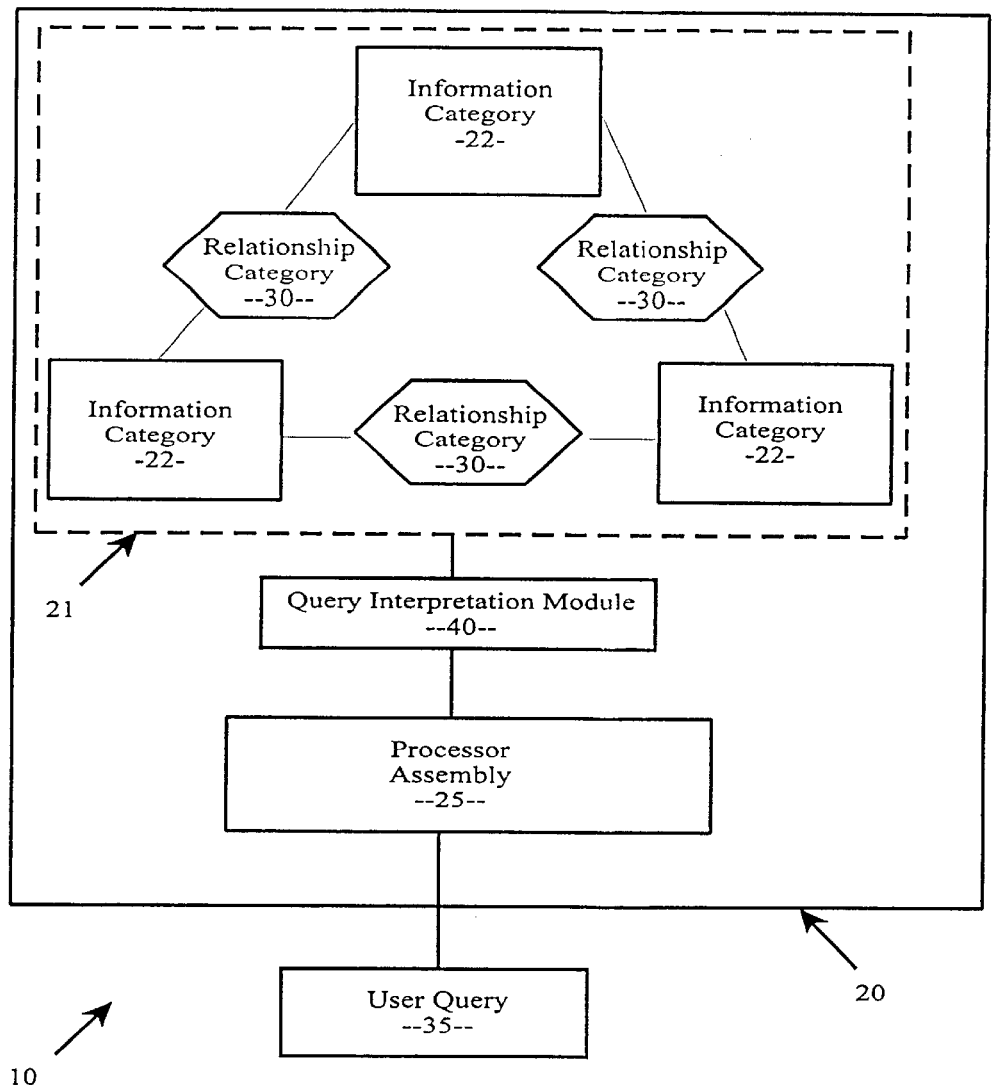
FIG. 2 is a schematic representation of another embodiment of the database querying system of the present invention.

Although the present database querying system 10 may be provided as an independent querying system originally programmed according to the system and method of the present invention, it is also recognized that this system and method of the present invention may also be effectively integrated within an existing database system. As a result, the query syntax that must be utilized by a user is substantially facilitated, and that simplification and more detailed query analysis also can be effectively achieved without requiring complex modifications and/or substantial additional training of the users. Along these lines, the processor assembly 25 to the database querying system 10 may be responsive to Open Database Connectivity (ODBC) query syntax, Structure Query Language (SQL) query syntax, any relational query language query syntax or any relational graphical query language query syntax. When integrated within the database query system 10 of the present invention, however, more simplified user queries 35 including the relationship identifier can still be effectively utilized to achieve the appropriate desired result. For example, in such an environment, and as illustrated in FIG. 2, a query interpretation module 40 is preferably provided. In particular, the query interpretation module 40, sometimes referred to as a semantic wrapper, is structure to utilize the relationship identifier from the user query to interpret the user query as the corresponding query which the processor assembly 25 has traditionally been configured to receive and interpret. Along these lines, the query interpretation module 40 may include a semantic conversion tool The semantic conversion tool is structured to identify relational schema of the database and convert those relational schemas to semantic schemas. It is the semantic schemas that allow more simplified identification of the relationships between the information categories. One factor that achieves the simplification utilizing the semantic schema is that the relationships can be presented in a semantic, object oriented format rather than the abstract, relational format wherein the user is required to identify all of the data items themselves, and must previously know the relational combinations of the various data items.

Because in some circumstances, such identification of the relational schemas of the database and conversion to semantic schemas for the purposes of this invention cannot be directly achieved, as there may be no specific semantic schema to correspond to the pre-existing relational schemas, the present invention, and in particular the query interpretation module, may include a knowledge base tool. In particular, the knowledge base tool, is structured to customize a conversion of at least some of the relational schemas into semantic schemas, actually generating a semantic schemas in some circumstances. As previously identified, in the illustrated embodiments of the present invention, a semantic conversion tool does not actually have to generate a new set of object data (relationship data items) based upon the semantic schema, but rather virtually converts the conventional schemas into semantic schemas for utilization by the processor assembly in query interpretation. As a result, a user is able to input the more refined user query including the relationship identifier, however, based upon the previously identified semantic schema for the pre-existing relational schema, that query may be used by the processor assembly to identify the desired data. Essentially, complex joinders and additional object data often required by the processor assembly 25 utilizing traditional mediums are supplemented seamlessly by the processor assembly 25.

From the processing, it can be seen that the present invention is further directed towards a method of simplifying a query syntax of an existing relational database. The method includes an initial step of identifying the at least two, but often a plurality of information categories containing objects data items. Relationship between those information categories are then identified and the relational schemas between those information categories are converted into semantic schemas. The semantic schemas are identified by a corresponding plurality of relationship identifiers indicative of a relationship between the object data items of the information categories. Relationship categories can then be defined from the relationship identifiers, and a query entered utilizing at least the relationship identifier.

The relationship identifier is then utilized to identify a desired item from the database by the processor assembly.

Furthermore, in connection with the present method, it is recognized that at least some of semantic schemas may actually be generated and that the user query will include in addition to the relationship identifier, an object based query so as to complete the user query and allow it to be effectively interpreted for retrieval of the desired data.

Similarly, in connection with a pre-existing object oriented database, the method may include the steps of identifying at least two or a plurality of information categories containing object data items, identifying the relationships between those objects data items of the information categories and defining relationship identifiers from the relationships between those object data items. The user query can then be entered utilizing at least a relationship identifier which is utilized to identify desired data items. For example, the relationship identifier facilitate the interpretation of the user query as an object query that may normally be utilized by the processor assembly.

From the preceding it is seen that the objective of the semantic wrapper of a relational database is to provide easier access to a legacy relational database, in parallel to continued access via existing legacy application software. The present system presents a semantic view over a relational schema. Accordingly, queries can be made simple and very short, and in some cases up to ten times shorter (and so easier to pose) than in relational databases. For example, the user need not bother about "joins"—cross-references between relational tables, many-to-many relations, inheritance. Additionally, shorter application programs may be utilized, in that user programs for a semantic view are substantially shorter than for a relational one, achieving major improvements in the application software development cycle, maintenance, and reliability. In one preferred embodiment wherein SQL, the standard relational database language, is adapted to the present inventions semantic database, programs in SQL for Sem-ODB tend to be an order of magnitude simpler and shorter than for a relational database. In one embodiment, the ODBC driver for the Semantic Wrapper of the present invention allows SQL querying of a semantic database and interoperability with relational database tools, e.g. end-user systems like MS Access Query-By-Example or Crystal Reports. In these tools the number of user keystrokes required is proportional to the size of the generated SQL program. As such, in such an embodiment savings are realized and simplicity is attained through the use of the semantic view of the present invention. An Embedded SQL interface for C and C++ may also provided, and the present invention may include a knowledge base tool that aids in reconstruction of a conceptual/semantic schema and documentation of a legacy relational database.

Now, for purposes of clarity, one embodiment of the present invention is described in the context of integration and/or comparison within a more traditional SQL query based system, the present invention referred to as Sem-SQL or Semantic SQL. Specifically, as indicated Structured Query Language (SQL) is the standard language used to write queries for relational databases. The present system and method, Semantic SQL (or Sem-SQL), interprets SQL with respect to semantic and object database schemas. The syntax of Sem-SQL is similar to that of Open Database Connectivity (ODBC) 3.0 standard SQL, but it is interpreted differently. The present invention re-interprets SQL in order to further a number of goals. For example, as SQL is a uniform interface provided by almost every database system, it is, perhaps, the most popular database language and it is known by millions of users. The availability of the Sem-SQL interface will significantly enhance the accessibility of semantic, object-relational, and object-oriented databases and of semantic interfaces to relational databases.

Sem-SQL also affords the possibility of supporting ODBC and JDBC, which are standard database-access interfaces. Sem-SQL and standard SQL are identical in syntax, however, from the users' point of view, using Sem-SQL will be different from but easier than using standard SQL. Sem-SQL queries refer to a virtual relational schema. This virtual schema consists of inferred tables, which are defined as a spanning tree of all the relations reachable from a given semantic category. (The central notion of semantic models is the concept of object, which is any real world entity that we wish to store information about in the database. The objects are categorized into classes according to their common properties. These classes are called categories.) Users query the database as if there were a universal table for each class with all the information derivable from it. However, a virtual table is never physically generated. Therefore, Sem-SQL is able to relieve users of explicitly expressing joins; conventional relational SQL requires them to do so. However, updates against a derived user view, and in particular against the virtual tables, are inherently ambiguous. Therefore, disambiguating semantics are provided in the data manipulation language part of Sem-SQL in terms of the underlying semantic database. SQL insert, delete, and update statements can then be applied to virtual tables, preserving the intuitive meaning of these operations. Sem-SQL enables users to manipulate data in a more intuitive way than the standard SQL does, so it turns out to be simpler and more user-friendly.

The present solution utilizes a semantic view of a database. Users compose their queries in Sem-SQL based on this semantic view. In case of a semantic or object-relational database, queries in Sem-SQL are translated into basic database operations. In case of a semantic view wrapping of a relational database, the queries are translated into relational SQL queries that are semantically equivalent. The basic idea of the query transformation is to restore the semantic query, which is usually formulated on the virtual tables, by adding the join conditions or sub-queries explicitly in the WHERE clause. This is achieved by referring to the mapping information between the semantic view and the relational schema. The basic components in relational schemas are tables, attributes, and foreign key links. Tables and attributes can be mapped to categories and attributes (concrete relations) respectively in the semantic model, while foreign key links can be represented by abstract binary relations in semantic model. The present semantic wrapper uses a knowledge base to store this mapping information. Sometimes such basic information may not be enough to complete the transformation. Therefore, the system, such as part of the knowledge base tool, includes a set of inference rules to derive new knowledge that is essential during the query transformation. These techniques can also be applied when integrating relational databases and semantic databases together in a heterogeneous multi-database environment where there are a number of autonomous semantic or relational databases. The semantic wrapper of a relational database first imports the relational schemas of databases and automatically converts them to semantic schemas. This conversion process maps every table to be a category and every functional dependency to be a relation in the semantic schema. This automatically generated schema does not contain semantically rich information such as inheritance, meaningful relation names, etc. Relational schemas are unable to represent such complex semantics so they cannot be automatically generated from the schema information. As such, the present invention includes the Knowledge Base Tool (KDB Tool), which is capable of customizing the generated schemas (enriching them with semantic information) with the interaction of the Database Administrator (DBA). The acquired knowledge and mapping between semantic and relational schemas are stored in the knowledge base which is implemented using a semantic database as well. The wrapper provides not only a semantically rich schema for the relational database but also an easy-to-use query language, Semantic SQL, for querying the generated semantic schema. The query translator or interpretation module transforms Semantic SQL queries posed on the semantic schema into semantically equivalent SQL statements on the relational schema. It uses the mapping information generated in the knowledge base along with the semantic and relational schemas. The query translation process uses temporary views to generate the appropriate projections of the virtual tables. Next, it proceeds to apply outer joins between these temporary views to provide query results. An important point to note is that the query translation process often generates substantially larger relational SQL statements for corresponding Semantic SQL statements. Though the translation algorithm does not necessarily provide optimal-size translated queries for every possible Semantic SQL query, this illustrates the ease of using Semantic SQL queries to generate complex queries. Since the translation process is automated, users are required only to specify the simpler Semantic SQL statements.

As mentioned, the present invention uses the same syntax as

Inferred Relations

Every abstract category C has the following inferred relations:

inverted relations: for every relation R:B->C, its inverse R_:C->B. The inverse relation has short name R_ and full name B_R_. It also may have a name defined in the schema. (Example: full name: instructor_works_in_; short name: works_in_; it may also have a schema-defined inverse name such as full: department_employs or short: employs.)

the identity relation, also called C: x.C=if x in C then x else null. (Example: instructor, full name: instructor_instructor)

for each direct subcategory S of C, there is an attribute Isa_S:C->{"y"}: x.Isa_S=if x in S then "y" else null. (Example: isa_student; full name: person_isa_student)

the combined attribute C_, which is the concatenation of all the original attributes of C (including attributes of supercategories of C, but not including attributes limited to subcategories of C) that are representable by printable strings (this includes numbers, enumerated, Boolean). The concatenated values are separated by slashes. Null values are replaced by empty strings. Attributes that are to-many are excluded. In case the schema defines no order between attributes of C, the order defaults to lexicographic by name of attribute.

| full attribute name | abbreviation | type | sample value |
| --- | --- | --- | --- |
| STUDENT | — | surrogate | 123235 |
| last_name | — | string | Smith |
| birth-year | — | integer | 1970 |
| the_student_the_offer_the_quarter_year | year | integer | 1999 |
| the_student_the_offer_the_quarter_season | season | string | Spring |
| the_student_final_grade | final_grade | integer | 75 |
| major | — | surrogate | CS |
| minor | — | surrogate | ECE |
| major_name | — | string | CompSci |
| minor_name | — | string | Electrical | the standard ODBC SQL (with null values). However, the present SQL queries refer to a virtual schema. This virtual schema consists of an inferred table T defined for each category C as a spanning tree of all the relations reachable from C. This virtual table T is never physically generated. The table T contains every attribute reachable from category C.

EXAMPLE

Figure 3:
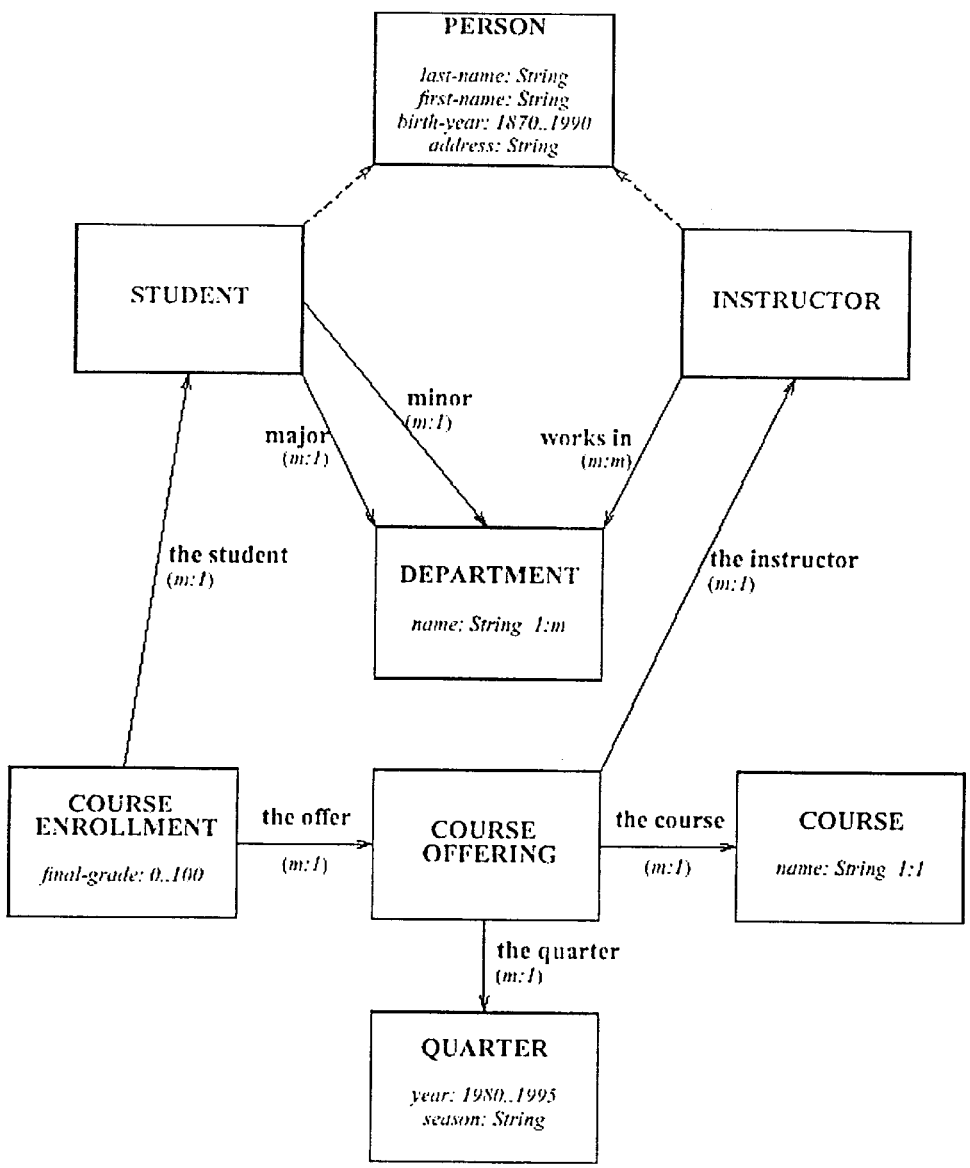
FIG. 3 is an illustration of a semantic schema for a university application.

Consider the Semantic Schema of FIG. 3

Original Relations

For every category C in the schema, the schema defines certain relations whose domain is the category C. Let r be a relation with domain C and range B, i.e. r:C->B. B can be another abstract category in the schema or it can be a concrete category, e.g. Number or String. The name of the relation r as defined in the semantic schema is called the short semantic name. It is unique among all the relations whose domain is C. The relation's full semantic name is made of the name of its domain and the short name: C_r. The short name is used only when the domain is known. (Example: short name: works_in; full name: instructor_works_in) The relation r is called to-many if it is possible that at some point in time there is an object x and two distinct objects y and z so that there are relationships xry and xrz. If this situation may never exist then the relation is called to-one.

in spatial-data databases, infinite virtual relations representing functions over space-time, which in the actual database are represented by a finite data structure.

Applicable Relations

A category C may be a sub-category of, a super-category of, or intersecting category of, another category E. All relations whose domain is E are applicable on objects of C.

Main Defenition

The virtual table T(C) for a category C, recursive definition:

1. The first attribute of T:

C—attribute of T, range: C (m:1)

2. For every attribute A of T, for every relation r applicable to the range of A:

A_r—attribute of T, range:range(r) (m:1)

Note: this virtual table is infinite. When interpreting a specific query, a finite projection of this table is assumed as further explained in Technical Notes.

The name of T is the same as of C.

Note: to-many original relations are reduced to-one attributes of the virtual table.

If the semantic relation r is many-to-many or one-to-many, the new attribute would be many-to-one, but many virtual rows would exist in the table T, one for each instance of the tree. If r has no value for an object, a null value will appear in the virtual relational table. The relation r may be inferred. The range of a virtual attribute may be of multimedia type: numbers with unlimited varying precision and magnitude, texts of unlimited size, images, etc.

Abbreviation of Prefixes

Every component relation r in the virtual attribute name may be named by its full semantic name or, if no ambiguity arises, by its short semantic name.

The attribute names of T contain long prefixes. These prefixes can be omitted when no ambiguity arises, i.e.: attribute y is an abbreviated synonym of an unabbreviated attribute x_y of T if T has no other unabbreviated attribute z_y where depth(z)<=depth(x).

depth(x)| is the number of relations present in x.

Surrogates

All attributes of T(C) of type Abstract are replaced by their surrogates of type String.

Characters

Prior to defining the virtual tables we "clean" the name of every relation or category: replace all non-alphanumeric characters with "_", if the name begins with a digit or "_", prepend "A", if the name ends with "_" append "Z", collapse multiple "_" into a single "_". If any ambiguity arises after the cleaning, the original schema is rejected by the Semantic SQL interpreter.

Definition of the Extension of a Table

The virtual table T for a category C is logically generated as follows:

1. Initially, T[C]=C, i.e. T contains one column called C whose values are the objects of the category.
2. For every attribute A of T, for every schema relation or attribute r whose domain may intersect range(A), let R be the relation r with its domain renamed A and range renamed A_r, let T be the natural right-outer-join of T with R. (Unlike a regular join, the outer join creates A_r=null when there is no match.)
3. For a given query q the virtual table against which q is interpreted, T[C,q]], is a projection of T[C]] on the following virtual attributes:
   the virtual attributes that appear in the query,
   the unabbreviated prefixes of said attributes (including the surrogate attribute C),
   and the attributes p_r where p is any of said prefixes and r is an original printable-type to-one attribute of the semantic schema.

Note: the projection operation here is a set operation with duplicated tuples eliminated.

User-control of Table Depth (Used only by sophisticated users trying to outsmart $MAXDEPTH defined by a graphical user interface; not needed by users posing direct SQL queries without a GUI.)

For each category C, in addition to the default table named C, of depth limited by $MAXDEPTH, there are also tables called C_i for any positive integer i, with the depth limited by i rather than $MAXDEPTH. Also, there is a table C_0 which includes only the original to-one attributes and relations whose domain is C or a supercategory of C and the surrogate attribute of C.

User-specified Tables (Used only by generic graphical user interfaces; not needed by users posing direct ODBC SQL queries)

Let C be a category. Let S={A1, . . . , Ak} be some unabbreviated attributes of the table C.

Let ENRICH(S) be the set of unabbreviated attributes of T(C) comprised of the attributes S, their prefixes, and one-step extensions of the prefixes by to-one attributes and relations.

(An attribute A is a prefix of an attribute in S if and only if A is in S or A_w is in S for some string w. An attribute B is a one-step extension of an attribute A if and only if B=A or B=A_w where w contains no underscores. Note that value of every such prefix A is an abstract object (surrogate))

We define a virtual table T(C,S) as the projection of the table T(C) on ENRICH(S).

The name of T(C,S) is generated as follows: for each Ai let Bi be the shortest synonym of Ai. The name of T is: B1_B2_ . . . Bk ODBC Schema Queries ODBC request for the names of all tables for every category the primary virtual table C and the tables C_0 and C_1.

ODBC request for the names of all attributes of a given virtual table T returns all attributes maximally abbreviated. If the request is for the virtual table corresponding to category C, only attributes of C_2 are returned.

ODBC request to browse the virtual table is denied. (Browsing of C_0 is permitted. Browsability of C_1 is not guaranteed).

Semantics of Updates

Updates against a derived userview, and in particular against the virtual relational database, are inherently ambiguous. Therefore, diambiguating semantics is provided here in terms of the underlining semantic database. SQL insert, delete, and update statements are applied to virtual relational tables preserving the intuitive meaning of these operations. Simple updates are explained below first.

This section explains simple updates where only the immediate attributes of categories are used.

1. delete from C where condition Removes objects from the category C (does not delete them from supercategories of C).

EXAMPLE delete from STUDENT where FINAL_GRADE<50

2. insert into C (attributes) query

Evaluates the query, resulting in a set of rows. For each row, a new object is created and placed in C. Its one-step relationships are assigned values from the rows. If a one-step relationship is m:m or 1:m only one value may be assigned.

EXAMPLE create a new student Jim in Physics:

insert into STUDENT (FirstName, Major) select distinct 'Jim', Department from DEPARTMENT where name='Physics'

EXAMPLE create a new instructor Jim in Physics (although WorksIn is a m:m relation, only one value is assigned in this statement):

insert into STUDENT (FirstName, WorksIn) select distinct 'Jim', Department from DEPARTMENT where name='Physics'

3. insert into C (attributes) values (assignments

Creates a new object, places it in the category C, and relates it to some one-step attributes (i.e. the original attributes/relations of category C and their inverses.)

4. update C set A1=e1 , . . . , Ak=ek where condition

Selects a set of objects of category C. For each of them updates some one-step attributes. For example, to make a person become a student:

update PERSON set Isa_STUDENT='y' where condition

To move the person from subcategory of students to subcategory of instructors:

update PERSON set Isa_STUDENT=null, Isa_INSTRUCTOR='y' where contition

EXAMPLE promote Johnson from student to instructor and change his phone to 222-2222:

update PERSON set Isa_INSTRUCTOR='y', Isa_STUDENT=null, Phone=2222222 where LastName='Johnson'

5. insert into C_R . . .

Allows creation of multiple relationships R. This cannot be accomplished with previous commands when R is many-to-many and many values need to be assigned. Note: C_R has been defined as a virtual table.

EXAMPLE let Johnson work in Physics insert into INSTRUCTOR_WorksIn (INSTRUCTOR, DEPARTMENT) select distinct INSTRUCTOR, DEPARTMENT from INSTRUCTOR, DEPARTMENT where INSTRUCTOR.LastName='Johnson' and DEPARTMENT.Name='Physics'

EXAMPLE let Johnson work in every department insert into INSTRUCTOR_WorksIn (INSTRUCTOR, DEPARTMENT) select distinct INSTRUCTOR, DEPARTMENT from INSTRUCTOR, DEPARTMENT where INSTRUCTOR.LastName='Johnson'

6. delete from C_R where condition

Allows deletion of multiple relationships R.

EXAMPLE do Not Let Johnson Work in any Department.

delete from INSTRUCTOR_WorksIn where LastName='Johnson'

7. Object surrogate assignment:

If in an insert statement there is an assignment of a user-supplied value to an object being created, that value becomes the object's surrogate, overriding surrogates generated by other algorithms. In the database it is entered into the attribute User Supplied Surrogate, which is enforced to be 1:1. Further, if this value begins with the character "#" the database will derive the internal object id from this value—it may have effect only on efficiency. If this value begins with a "$" it will be automatically erased at the end of the session.

EXAMPLE insert into INSTRUCTOR (Instructor, FirstName) values ('John', 'John')

Note: as was specified in a previous section, any expression producing an abstract object is automatically converted into that object's surrogate. The algorithm for surrogate generation is given below but can be overridden by the user as above.

We now turn to non-simple updates.

Disambiguation of Arbitrary SQL Updates

Let C be a category against which an update operation is performed.

Notation:

T=T(C)|—the virtual table of C.

A—the list of full names of attributes of T that are assigned values in the operation.

R1, . . . , Rn—the set of relations of C such that for some suffix s, Ri_s is in A. (That is, Ri_s is a two-step or deeper attribute.)

C1, . . . , Cn—the ranges of R1, . . . , Rn.

Si—list (s|Ri_s in A) in the order of appearance in A.

V( )|—For every attribute a in A let V(a)| be the value being assigned to the attribute a. For every s in Si let V(s)| be the value assigned to Ri_s. Let V(Si) be the list of V(s) where s in Si.

Ei—the list of assignments s=V(s)| for s in Si.

1. delete from C where condition a. perform: select C from C where condition b. for every resultant object o in C: remove o from C.

EXAMPLE delete from STUDENT where FINAL_GRADE<50

2. insert into C (attributes) values (assignments)

a. Create a new object in C. Let this object be denoted (o). Its one-step relationships are assigned values from the assignments. If a one-step relationship is m:m or 1:m only one value may be assigned. b. For every category Ci in C1 . . . Cn do:

(1) if Ri_Ci is in A and V(Ri_Ci)="new"

then recursively perform:

insert into Ci (Si) values (V(Si));

let v be the object inserted above else do:

(2.1) perform: select Ci from Ci where Ei (2.2) if the above select results in exactly one object, then denote that object v else abort with an error message (2) relate: o Ri v

EXAMPLE create a New Student James in the Department in which Johnson Works and Enroll Jim in the Only Existing Offering of "Magnetism":

3. insert into C (attributes) query a. Evaluate the query, resulting in a set of rows. b. For each row r perform: insert into C (A) values (r)

EXAMPLE for Every Instructor Create a Department Named After Him and Make Him Work there.

| insert | into STUDENT | | | |
|---|---|---|---|---|
| (FirstName, | Major_WorksIn_LastName, | Enrollment, | The_Course) | |
| values | ('James', | 'Johnson', | 'new', | 'Magnetism') |

4. update C set assignments where condition a. perform: select C from C where condition b. for every object o in the result of the above query perform: (1) The object's one-step relationships are assigned values from the assignments, i.e.:

for every one-step attribute Ai in A perform: o.Ai:=V(Ai) (2)
For every category Ci in C1 . . . Cn do:
  (2a) if Ri_Ci is in A and V(Ri_Ci)="new" then recursively perform:
    (2a1) insert into Ci (Si) values (V(Si));
    (2a2) let v be the object inserted above (2b) else do:
    (2b1) perform: select Ci from Ci where Ei
    (2b2) if the above select results in exactly one object, then denote that object v else abort with an error message (2c) o.Ri:=v
5. insert into C_R . . .

| insert into | DEPARTMENT | |
|---|---|---|
| | (Name, | WorksIn_) |
| select | LastName, | Instructor |
| from | Instructor | |

Allows creation of multiple relationships R. This cannot be accomplished with previous commands when R is many-to-many and many values need to be assigned. Note: C_R has been defined as a virtual table.

EXAMPLE let Johnson work in Physics insert into INSTRUCTOR_WorksIn (INSTRUCTOR, DEPARTMENT) select distinct INSTRUCTOR, DEPARTMENT from INSTRUCTOR, DEPARTMENT
  where INSTRUCTOR.LastName='Johnson' and DEPARTMENT. Name='Physics'

EXAMPLE let Johnson work in every department insert into INSTRUCTOR_WorksIn (INSTRUCTOR, DEPARTMENT) select distinct INSTRUCTOR, DEPARTMENT from INSTRUCTOR, DEPARTMENT where INSTRUCTOR.LastName='Johnson'
  6. delete from C_R where condition
  Allows deletion of multiple relationships R.

EXAMPLE do not let Johnson work in any department Smith works in. delete from INSTRUCTOR _WorksIn where LastName='Johnson' and WorksIn (select WorksIn from INSTRUCTOR where LastName='Smith')
7. Object surrogate assignment: if in an insert statement there is an assignment of a user-supplied value to an object being created, that value becomes the object's surrogate, overriding surrogates generated by other algorithms.

EXAMPLE
insert Into INSTRUCTOR (Instructor, FirstName)
  values ('John', 'John') Note: as was specified in a previous section, any expression producing an abstract object is automatically converted into that object's surrogate. Examples of semantic SQL and comparison to relational SQL This section contains: the semantic schema of a Hydrology application; a normalized relational schema of the same application (a real schema, not our virtual schema); several SQL statements written for the semantic schema and (for comparison) for the relational schema.

Figure 4:
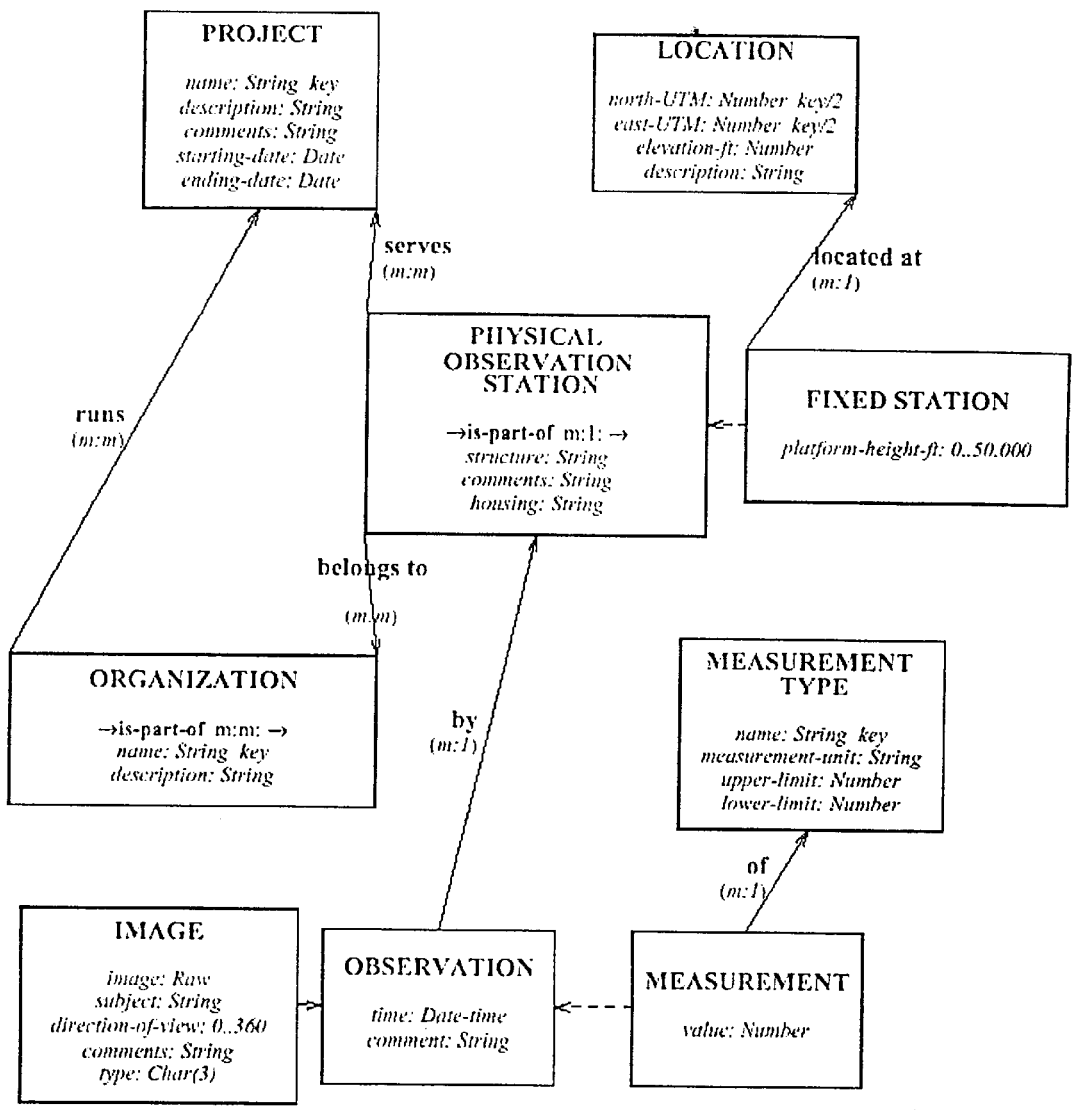
FIG. 4 is a schematic representation of the semantic schema for a hydrology application.

The Hydrology schema of this example is actually a small one-page subschema of the 100-page schema of the database that we have developed for the Everglades National Park. In that regard, FIG. 4 illustrates the Hydroogy Application Semantic Schema wherein boxes are categories of objects (dashes connect sub- to super-categories), solid arrows are semantic relationships (many-to-many relationships are marked m:m). Keys are optional, changeable, combinable identifiers. Numbers are optionally of unlimited size and precision. Strings and raw attributes are optionally of unlimited length. Conversely, FIG. 5 illustrates a schema developed for a relational DBMS is functionally equivalent to the previous semantic schema (if we disregard the "flexibility parameters": numbers will have limited size and precision, keys must always exist and cannot be changed, etc.). FIG. 6 illustrates a program size comparison between the two.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:
1. A database query system comprising:
  a) a first database including at least a first and a second information categories, and at least one relationship between information categories;
  b) a query language able to specify retrieval of data from a flat table, said query language incompatible with said first database;
  c) a plurality of object data items categorized in said information categories;
  d) a plurality of instances of said relationships;
  e) a schema of a virtual logical table, said virtual logical table including a plurality of virtual rows, each of said rows including a plurality of attributes reachable from said information category by any number of forward or backward traversals of said relationships between said information categories and application of attributes of said information categories,
  f) a user query formulated in said query language in terms of said virtual table; and
  g) a processor assembly responsive to said user query, said processor assembly directly operates said first database based on said user query.
2. A database querying system comprising:
  a) a first database including at least a first and a second information categories, and at least one relationship therebetween;
  b) a query language able to specify retrieval of data from a flat table, said query language incompatible with said first database;
  c) a first plurality of object data items categorized in said first information category;
  d) a second plurality of object data items categorized in said second information category;
  e) a plurality of instances of said relationships;
  f) a virtual database schema defining a virtual table, said virtual table including a plurality of virtual rows, each of said virtual rows including a plurality of attributes of an object data item of said first category and of virtual attributes thereof, each of said virtual attributes representing a chain of forward or backward traversals of said relationship and attributes of said information categories;
    a user query formulated in said query language in terms of said virtual table; and
    a processor assembly responsive to said user query, said processor assembly structured to directly identify desired data in said first database from said user query.

3. A database querying system as recited in claim 2 including a plurality of said information categories, said virtual table being defined by said relationships between each of said information categories.

4. A database querying system as recited in claim 3 wherein said plurality of said information categories are defined in an object oriented schema.

5. A database querying system as recited in claim 3 wherein said plurality of said information categories are defined in an object-relational schema.

6. A database querying system as recited in claim 3 wherein said plurality of said information categories are defined in a semantic schema.

7. A database querying system as recited in claim 3 wherein said plurality of said information categories are defined in an entity-relational schema.

8. A database querying system as recited in claim 3 wherein said plurality of said information categories are defined in a conceptual schema.

9. A database querying system as recited in claim 2 wherein said query language includes an Open Database Connectivity (ODBC) query syntax.

10. A database querying system as recited in claim 9 wherein said processor assembly includes a query interpretation module structured to utilize said virtual table formulation of said user query to interpret said user query as an ODBC query structured to be used by said processor assembly to identify the desired data.

11. A database querying system as recited in claim 2 wherein said query language includes a Java Database Connectivity (JDBC) query syntax.

12. A database querying system as recited in claim 11 wherein said processor assembly includes a query interpretation module structured to utilize said virtual table formulation of said user query to interpret said user query as an JDBC query structured to be used by said processor assembly to identify the desired data.

13. A database querying system as recited in claim 2 wherein said query language includes a Structured Query Language (SQL) query syntax.

14. A database querying system as recited in claim 13 wherein said processor assembly includes a query interpretation module structured to utilize said virtual table formulation of said user query to interpret said user query as an SQL query structured to be used by said processor assembly to identify the desired data.

15. A database querying system as recited in claim 2 wherein said query language includes an Object Query Language query syntax.

16. A database querying system as recited in claim 2 wherein said query language includes a graphical query language query syntax.

17. A database querying system as recited in claim 2 wherein said processor assembly includes a query interpretation module structured to utilize said virtual table formulation of said user query to interpret said user query as an open form query structured to be used by said processor assembly to identify the desired data.

18. A database querying system as recited in claim 17 wherein said query interpretation module includes a semantic conversion tool structured to identify relational schemas of the database and convert said relational schemas into semantic schemas.

19. A database querying system as recited in claim 18 wherein said semantic schemas are identified by said relationships between said information categories.

20. A database querying system as recited in claim 19 wherein said query interpretation module includes a knowledge base tool, said knowledge base tool structured to customize a conversion of at least some of said relational schemas into said semantic schemas.

21. A database querying system as recited in claim 20 wherein said knowledge base tool is structured to generate said semantic schema.

22. A database querying system as recited in claim 19 wherein said semantic conversion tool is structured to virtually convert said relational schemas into semantic schemas for utilization by said processor assembly.

23. A method of simplifying a query syntax of an existing relational database having a relational schema, said method comprising:

a) identifying at least two information categories containing object data items;

b) identifying relationships between said information categories;

c) converting said relational schema into a semantic schema identified by a corresponding plurality of relationship identifiers representative of a relationship between said object data items of said information categories;

d) defining a relationship category from said relationship identifiers;

e) entering a query utilizing at least said relationship identifiers, wherein said query is formulated in a syntax of a language intended for relational databases but refers to said semantic schema;

f) utilizing at least said relationship identifier to identify a desired data item from the database;

g) a middleware processor assembly interpreting said query by automatically translating said query into an equivalent second query in said language, which second query is formulated in terms of said first relational database.

24. The method of claim 23 further comprising generating at least some of said semantic schemas.

25. The method of claim 23 wherein said entering said query further comprises entering an object based query with said relationship identifier.

* * * * *